Oct. 11, 1955 O. SCHUMACHER 2,720,641

COMBINED CLOCK AND PAGING SYSTEM

Filed May 21, 1954 5 Sheets-Sheet 1

INVENTOR.
OTTO SCHUMACHER

BY R. E. Sandt
AGENT

Oct. 11, 1955 O. SCHUMACHER 2,720,641

COMBINED CLOCK AND PAGING SYSTEM

Filed May 21, 1954 5 Sheets-Sheet 2

*INVENTOR.*
OTTO SCHUMACHER

*BY* R. E. Sandt

AGENT

COMBINED CLOCK AND PAGING SYSTEM

Filed May 21, 1954 5 Sheets-Sheet 3

*INVENTOR.*
OTTO SCHUMACHER
*BY* R. E. Sandt
AGENT

COMBINED CLOCK AND PAGING SYSTEM

Filed May 21, 1954 5 Sheets-Sheet 4

INVENTOR
OTTO SCHUMACHER
BY R. E. Sandt
AGENT

INVENTOR.
OTTO SCHUMACHER
BY R. E. Sandt
AGENT

United States Patent Office 2,720,641

Patented Oct. 11, 1955

2,720,641

COMBINED CLOCK AND PAGING SYSTEM

Otto Schumacher, Boblingen, Germany, assignor to International Business Machines Corporation, New York, N. Y., a corporation of New York Application May 21, 1954, Serial No. 431,535

10 Claims. (Cl. 340—310)

This invention relates to a paging system and more particularly to a paging system operated in conjunction with a self-regulated impulse type clock system.

The object of this invention is to provide a paging system operating over the same wires used for impulsing and regulating secondary clocks so that the paging and time systems are mutually non-interfering.

Known call systems function either by means of a single line actuating a step switch which brings an indicating means into a position corresponding to the person called or by actuating an individual indicating means via one of several lines. In systems of the latter kind, several persons can be called simultaneously. All of these systems, however, require their own wiring system. Call systems that use existing telephone lines are also known, but these can function only when the line in question is not busy. Again, only one person can be called at a time.

A call system according to the invention does not require any transmission or call lines of its own, being controlled via the existing clock or signal lines of an electric master clock or signal system. In clock systems, the wiring generally carries current for only one or two seconds in each minute. The rest of the time, there is nothing to prevent the use of these lines for the call system; however, even the occurrence of a clock impulse during the calling process will not interfere with the latter, nor does a calling operation interfere with the clock and signal system.

Calling of individuals is generally effected from the telephone switchboard or other central point. In both cases, the operator is likely to be burdened with other duties. It is therefore not feasible to take special care, for example, to avoid operating the system during the occurrence of a clock impulse, or to avoid pushing the buttons for two calls simultaneously. According to a special feature of the invention, a call impulse, no matter when the button is pushed, is transmitted only when no clock impulse is being transmitted; if several buttons are pushed simultaneously, the call impulses are transmitted successively in order of length, whether or not a clock impulse intervenes.

The system employs the pulse-length technique, in which the various persons to be called are distinguished by call impulses of different lengths. At the transmission station, cams selected by means of pushbuttons and driven by a synchronous motor determine the pulse length, and at the receiving stations, the pulse length determines the angle of rotation of a contact lever selecting the corresponding indicating means and likewise driven by a synchronous motor.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1*a* is a part of the diagram of the transmitting station;

Fig. 1*b* is a further part of the diagram of the transmitting station;

Figure 5A:
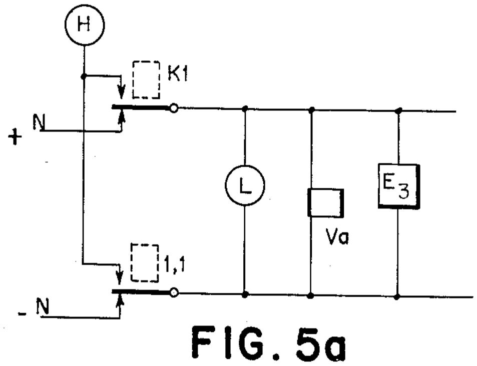
Figure 5B:
Figure 6:
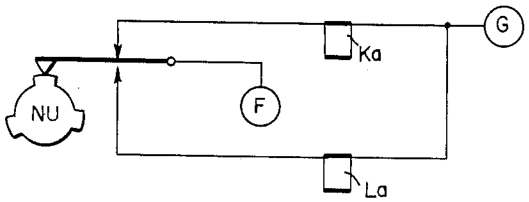
Figure 7:
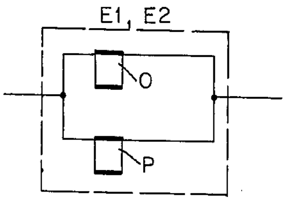
Figure 8:
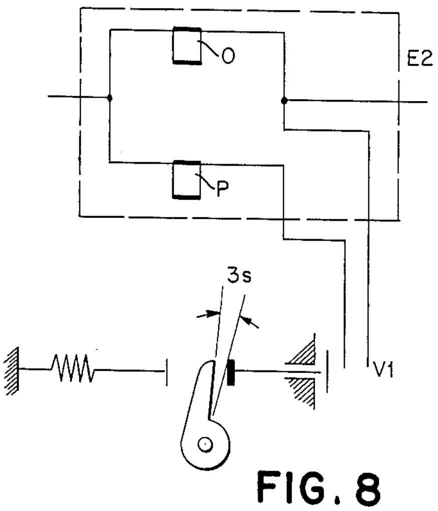
Figure 9:
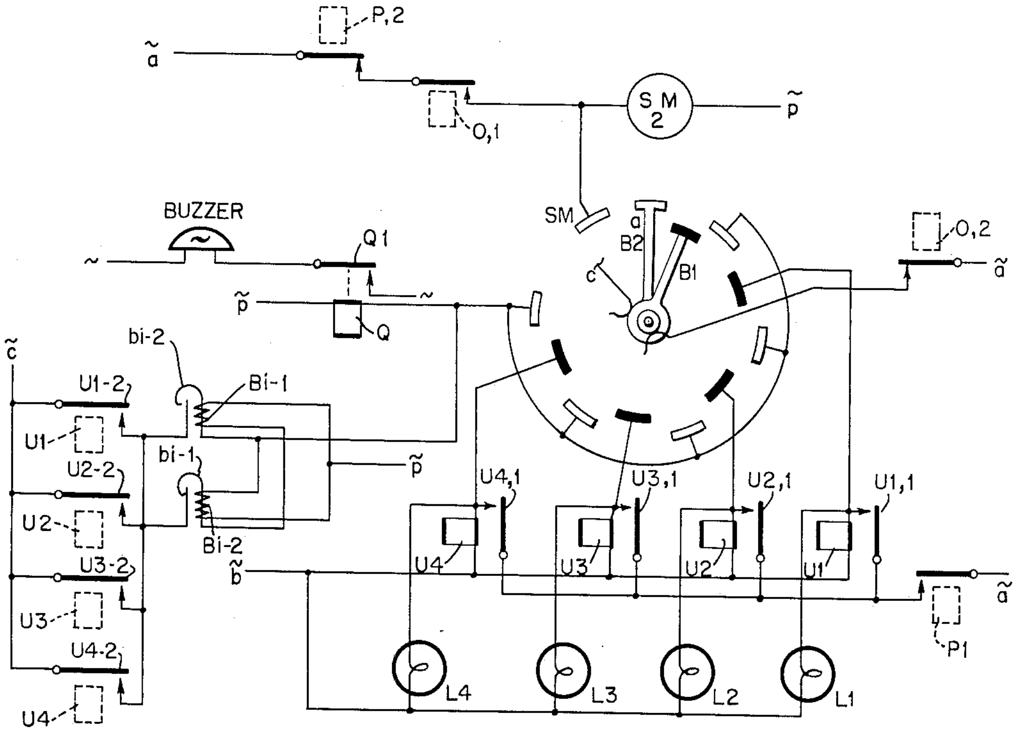
Figure 10:
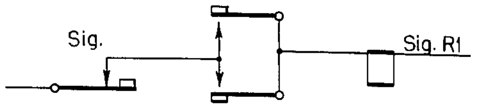

Figs. 5*a* and 5*b* show a non-self-monitoring clock system, operating on impulses of alternating polarity;

Fig. 6 shows a contact and switch mechanism in a receiver at a clock in the system of Fig. 5*a*;

Fig. 7 shows the relay circuit in the call receiver;

Fig. 8 shows a variant of Fig. 7 for a clock system with impulses of alternating polarity;

Fig. 9 shows the selector and indicator unit in the receiver;

Fig. 10 shows the use of signal lines.

Figure 11:
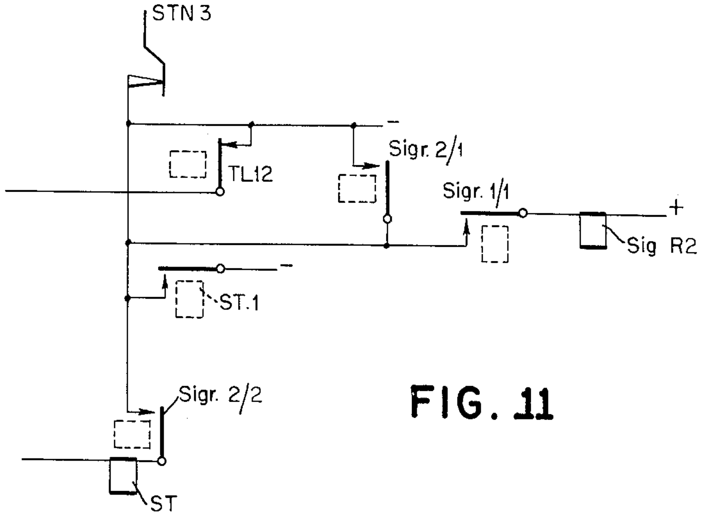

Fig. 11 shows the relay contacts of Fig. 10; and

Figure 1A:
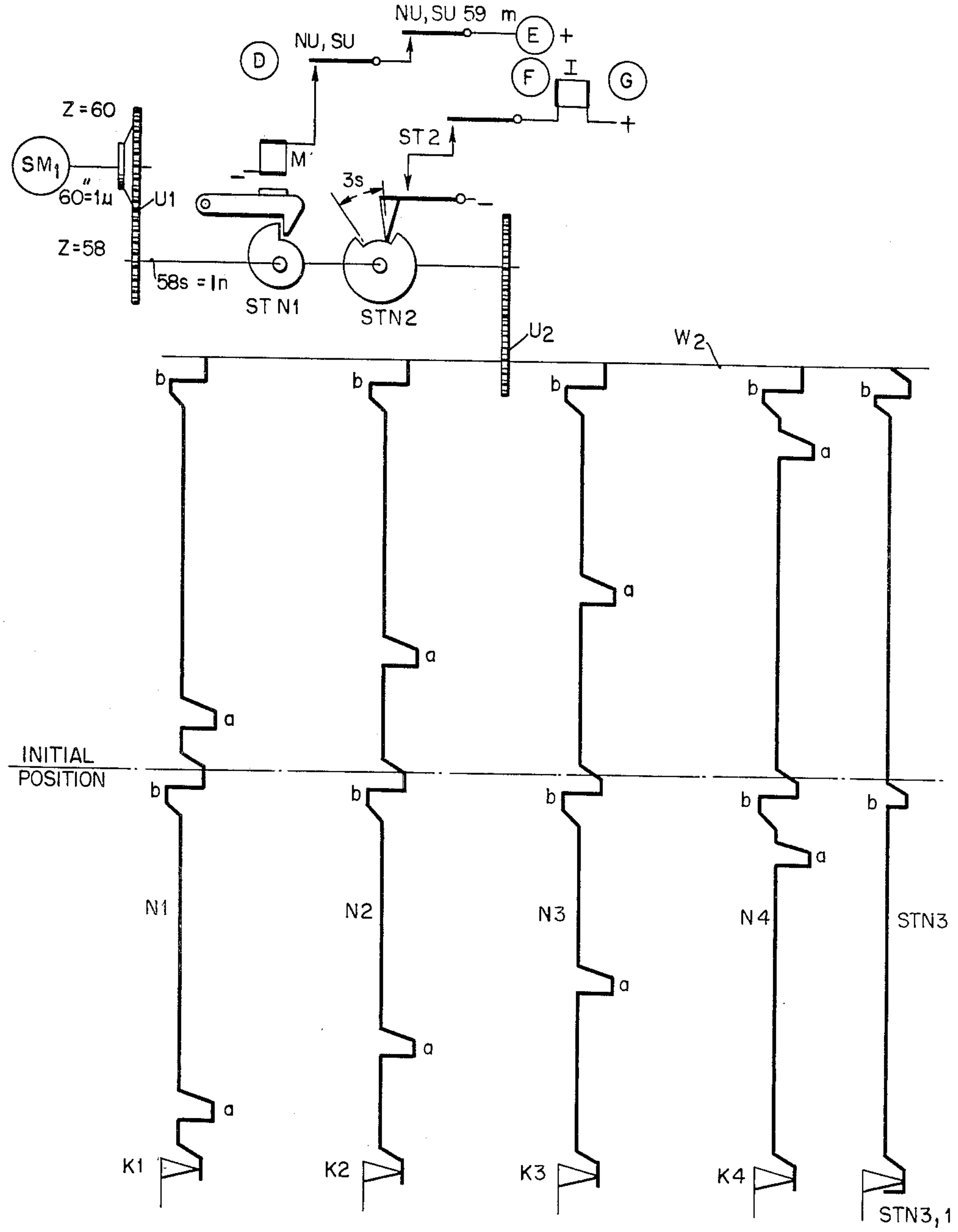
Figure 1B:
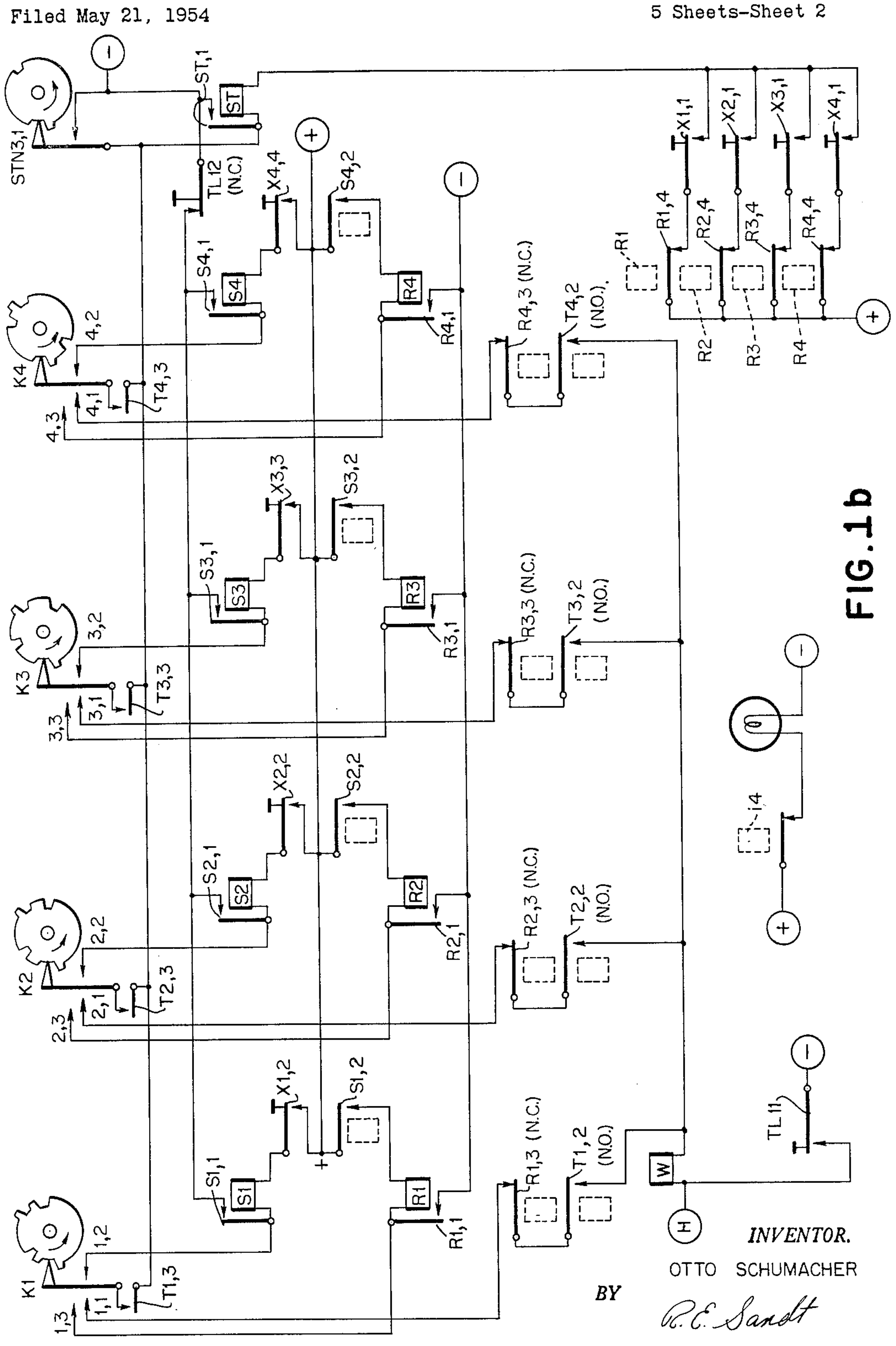
Figure 12:
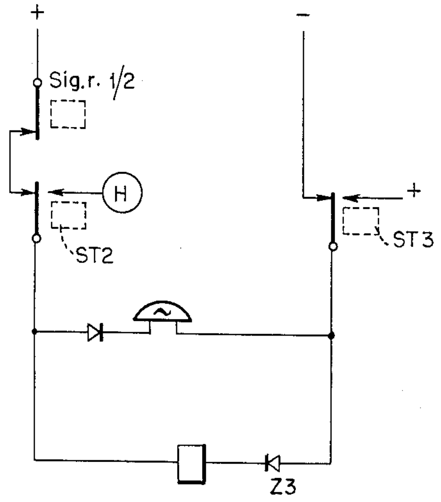

Fig. 12 shows addition to Fig. 1*b* for use with Figs. 10 and 11.

The continuously running synchronous motor SM1 (Fig. 1*a*) drives the cams S*t*N1 and S*t*N2 via a pair of gears. The gear ratio *u*1 is so chosen that these cams revolve once in fifty-eight seconds. Normally, the cam S*t*N1 and hence all the rest of the drive is prevented from continued rotation by means of a pawl and a slip clutch. The shaft bearing these cams, via a pair of gears *u*2, drives a second camshaft W2 which drives an additional individual cam N1 to N4 for each person to be called, as well as an additional master cam S*t*N3. In the cams N1 to N4, the pulse lengths corresponding to the persons to be called are determined by the distance of a notch *a* from the initial position. The end of a cycle of the machine is marked by a cam projection *b*. In the example of the embodiment, each cam N1 to N4 bears the codes for two cycles, as symbolically shown in Fig. 1. Since, in the course of one minute, the cam passes under the contacts K several times, provision must be made so that no matter when the call button X is pushed, the call circuit will not be set up until the beginning of a new cycle. This cannot happen until the contact *stn*3, 1 is closed by master cam S*t*N3. The circuit for the relay S*t*, after actuation of one of the pushbutton contacts X1, 1 to X4, 1, cannot be closed until the corresponding contact *r*1,4 to *r*4, 4 is also closed. The corresponding relays R1 to R4 are not actuated by the projection *b* until the end of a cycle, so that before each new cycle, the contacts *r*1, 4 to *r*4, 4 are opened, whereby the holding circuit of the relay S*t*, which may previously have been actuated, is broken. When the contact *stn*3, 1 has left the initial position on master cam S*t*N3 and thereby been opened, pressure on a button X has no effect, contact S*t*, 1 being open, until the contact S*tn*3—1 is closed again. It is only upon actuation of relay ST and closure of contact S*t*, 1 that the call circuit can be established.

At the master clock, or any clock of a clock system of the self-monitoring type and adjacent to the master or transmitting station of the call system, the contacts *nu/su* and *nu/su*59$^{m}$ are provided. In the self-monitoring system, correction impulses are transmitted in the 59th minute, and during that time the contact *nu/su*59$^{m}$ is opened, so that the magnet M releasing the drive of the entire cam system cannot be actuated. But this does not mean that call lamps lighting up e. g. in the 58th minute will go out in the 59th minute. Instead, such lamps will remain lighted for any desired additional period, as will be explained below. The contact

Figure 3:
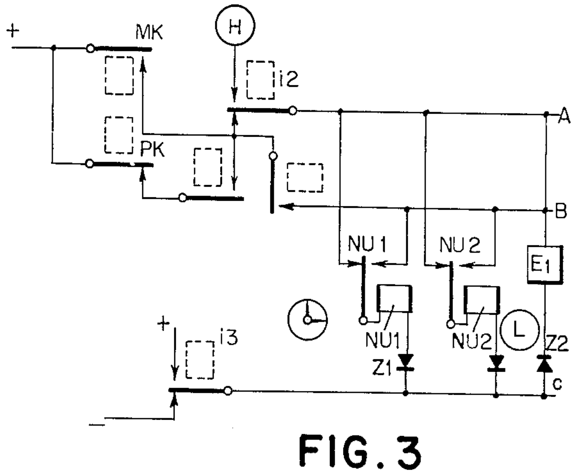
Fig. 3 is a diagram of a clock line of the three-lead self-monitoring type, with supplementary receiver for call impulses. The system is to be regarded as connected at H to the point similarly marked in Fig. 1.

*nu*/*su* is closed when the normal one-minute impulse for advancing the clock system is transmitted. The magnet M therefore acts during every minute except the 59th, thus releasing the cam drive. Upon arrival of the one-minute impulse, the clock NU1 is actuated in known manner, as in Fig. 3, via a circuit reading as follows: Positive line; *mk*; *i*2; *nu*1; NU1; *z*1; *i*3; negative line. At the receiver E1, this impulse is without effect, because of the barrier cell *z*2. The cam system will now run for fifty-eight seconds. About thirty seconds after the clock-advance impulse is sure to be completed, the cam S*t*N2 prepares the circuit for relay I, which is closed when the contact *st*2 closes upon actuation of the relay S*t*.

If person 2, for example, is called by pushing button X2 at any time, the call circuit cannot be established until the cams N1 to N4 and *st*N3 pass through the initial position. The relay S*t* is then actuated via the following circuit: Positive line; *r*2, 4; X2, 1; S*t*; *stn*3, 1; negative line. The relay S*t* holds via contact *st*1 until contact *r*2, 4 opens. When the initial position has just left the contact K2, and when S*t* is actuated, the following circuit is formed: Negative line; *st*1; *t*2, 3; spring contact K2; contact 2, 1; contact *r*2, 3; contact *t*2, 2 (now closed because relay T2 [Fig. 2] is actuated); resistance W; point H; transition to Fig. 3; contact *i*2; receiver E1; tube *z*2; contact *i*3; positive line. Since the relay S*t* was actuated, relay I is also actuated, and has switched its contacts *i*2 and *i*3. This call circuit is inoperative for clocks NU1 and NU2 because of the barrier tubes *z*1. Receiver E1, as in Fig. 7, contains relays O and P in parallel. However, only the relay O, responding to a lower voltage, is acautated. The relay P, reacting to a higher voltage, cannot respond because the resistance W (Fig. 1*b*) produces a voltage drop. The reduced voltage can only actuate relay O.

In Fig. 9, the contact *o*1 connects the synchronous motor SM2 at the receiving station. At the same time, contact O2 disconnects the brush B1 of a slide contact connected to the synchronous motor from voltage, and this until relay O is shut off again. This happens when the cam contact K2 reaches the depression *a* in the cam N2. At that time, the brush will have reached a certain contact sector, namely the one for relay U2. The relay U2 is actuated and holds via contact *u*2, 1. As long as relay U2 is actuated, the lamp L2 will stay lit. At the very beginning of the impulse, i. e. when the relay O is actuated, a number of contact sectors in parallel, supplied with current by a second brush B2 connected to brush B1, via line *c*, will actuate relay Q, causing emission of an acoustic signal. The acoustic signal, after lighting of the call lamp L2, will be repeated at fairly long intervals, under the control of the bimetalllic switch relays B1 and B2, as long as one of the contacts *u*1, 2 to *u*4, 2 is closed.

When the cam contact K2 engages the depression *a* (Fig. 1*a*), the circuit is broken at point H, and the following circuit formed via contact 2, 2: Positive line; button X2, 2; relay S2; contact 2, 2; center blade of cam contact K2; contact *st*1; negative line. Relay S2 is actuated, and holds via contact *s*2, 1, connected to the negative line through the clearing key TL12. The relay S2 is shut off when button X2, 2 returns to reset position, or when the clearing contact TL12 is opened.

When the cam contact K2 leaves the depression *a*, the pulse circuit via contact 2, 1 to the receiver is closed again, and the synchronous motor SM2 passes on to its initial position. In order to ensure arrival of the synchronous motor at its original position, together with correction of slight inaccuracies due to slippage in the motor etc., a contact sector SM is provided, directly connected to the synchronous motor and traversed by the brush B2. After the brush B2 has traversed the sector S*m*, the motor stops.

The contact *s*2, 2 also prepares a circuit for the relay R2. When the cam contact K2 reaches the projection *b*, the contact 2, 3 is closed and the center blade actuates the relay R2, which holds via contact *r*2, 1 until the call button X2 returns to its initial position, i. e. until the calling operation is completed. After opening the contact *r*2, 3, the cam N2 becomes inoperative for any new impulse transmission. Contact *r*2, 4 shuts off the relay S*t*.

If several buttons X are pressed simultaneously, or if another button is pressed during the impulse transmission due to pressing one button, it is possible according to the invention for the impulses corresponding to these manipulations to be transmitted successively without mutual interference, with the required pulse length. For example, since the control circuits to the receiver are not established until cam S*tn*3 passes through its initial position, it is possible for several switches to be actuated up to that time. Since only one cam can become operative for impulse transmission, the effect of another cam is stored for a brief period until the first impulse has been properly dealt with by the receiver. For example, if buttons X1 and X3 are pushed simultaneously, only the circuit of button X1 becomes operative, because a contact *t*1, 1 (Fig. 2) prevents actuation of the superior relay T and hence operation of the superior cams. If, as previously described, at the end of a cycle, the relay R1 was actuated by part *b* of cam N1, then the relay T1 will be disconnected again via contact *r*1, 2. The contact *t*1, 1 closes, and relay T3, whose circuit has been prepared by the button X3, is actuated, so that now, beginning from the initial position of cam N3, the impulse can be transmitted to the receiver via contact *t*3, 2. First the lamp L1 and then the lamp L3 will therefore light up.

The invention likewise makes provision so that if button X4, for the longest pulse length, is pushed first, other persons, such as number 2, can be called simultaneously while that impulse is still being transmitted. If cam contact K4, upon additional manipulation of button X1, is already in a position past the point on cam N4 corresponding to part *a* of cam N1, then, of course, operation of button X1 is without effect because relay S1 can be actuated only by part *a* of cam N1. But the button contact X1, 3 actuates the relay T1, and contact *t*1, 1 shuts off relay T4, while contact *t*4, 2, now open, renders pulse transmission by cam N4 inoperative. But if contact K1 has passed part *a* of cam N1, contact 1, 1 forms a circuit to the receiver relay O, as a result of which the synchronous motor SM2 tends to move on to its initial position.

Now if button X2 is pushed before contact K2 has reached part *a* of cam N2, then this cam will determine the pulse length, for contact *t*2, 1, now opened, renders relay T4 inoperative. As soon as pulse transmission by cam N2 has been completed, i. e. at part *b*, contact 2, 3 actuates relay R2, and opening of contact *r*2, 2 renders relay T2 inoperative. By closure of contact *t*2, 1, control passes over to cam N4.

Thus several persons can be called simultaneously by means of the corresponding lamps L1 to L4. When one of the persons answers, his lamp is extinguished. The corresponding button X is returned to initial position and the clearing button TL pressed briefly. This transmits a higher voltage to the receiver via contact TL11, because the resistance W does not act, so that relay P in receiver E1 is now also actuated. The rest contacts *p*1 and *p*2 (Fig. 9) are opened, whereby the circuit for the synchronous motor and the holding circuit of relays U1 to U4 are both broken. All lamps go out, but the lamps of the other persons called will go on again after at most one cycle, since, immediately upon release of button TL, the aforementioned process for simultaneously pushing several buttons is repeated, several buttons X being still depressed.

A lamp L (Fig. 1) will light up whenever relay I is not actuated, i. e. while a clock impulse is being transmitted. During this time, button T1 should not be operated. Not that this would in any way interfere with the system; however, it would be without effect, since during the clock impulse, the call system is disconnected from the clock system.

In three-lead self-monitoring systems, impulses do not change polarity on all three lines. By means of barrier cells *z*1 and *z*2 (Fig. 3), undesired impulses can be kept away from the call signal receivers E1 as well as from the clocks NU. Call and clear signals are distinguished by different voltages.

Figure 4:
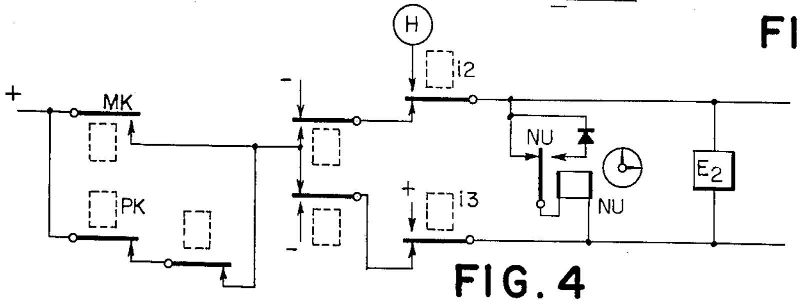
Fig. 4 shows a clock system of the two-lead self-monitoring type.

In two-lead self-monitoring clock systems (Fig. 4) barrier cells cannot be used because the individual leads have different polarities at different times. The call impulses here have a lower voltage than the clock impulses, and the voltage of the clear impulses is also below that of the clock impulses. The impulses for the call receiver E2 are transmitted by contacts *i*2 and *i*3 of the relay J controlled by cam S*t*N2. The relay O of receiver E2 in Fig. 8, of course, will respond to each clock impulse. The synchronous motor will therefore start every minute, but will not reach a contact sector for actuation of a relay U because a cam V connected to the switch contact must move against the pressure of a spring. The switch cannot release itself from this pressure until after an angle corresponding to a period of three seconds. Since the one-minute impulse is always shorter than this, the cam finger will return the synchronous motor to its original position after each one-minute impulse. But when the cam has passed the spring lock, the synchronous motor can complete its cycle without hindrance or return. Just before the cam V leaves the spring lock, contact *v*1 in the circuit of relay P (Fig. 9) is briefly closed. In a call impulse, however, the voltage is insufficient to actuate relay P. But a clearing pulse has a higher voltage, so that relay P can be briefly actuated, interrupting the corresponding circuits in the receiver by means of contacts *p*1 and *p*2. In this clock system, then, the clearing button must be held for at least one cycle, which is brought about by known means.

Figure 2:
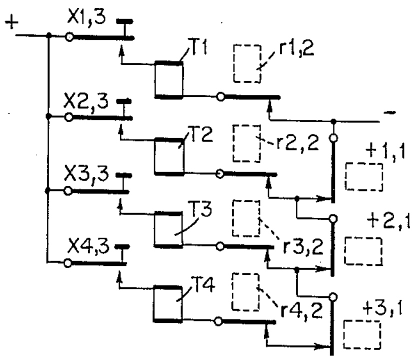
Fig. 2 represents a portion of Fig. 1, modified for the purpose of clearing and operation with several buttons pushed simultaneously.

The clock systems hitherto described are provided with neutral magnets. In a system with pole magnets and impulses of alternating polarity, cams S*t*N1 and S*t*N2 in Fig. 2 are replaced by the arrangement in Figs. 5*a*, 5*b* and 6. Between points D and E in Fig. 1*a*, according to Fig. 5*b*, there is a contact V*a*1 of a high-resistance relay V*a* responding to each one-minute impulse (Fig. 5*a*). As a result, the magnet M (Fig. 1*a*) releases the cam mechanism upon a one-minute impulse. The clock NU (Fig. 6) used for the transmitter drives a cam which, after each one-minute impulse, alternately prepares either relay K*a* or relay L*a* for actuation, instead of relay J. Between clock impulses, in known manner, both lines N are kept at the same preferably positive potential. The line which, at the last one-minute impulse, had a negative potential, is connected to H via *k*1 or *l*1, i. e. to the call system. The call impulse now has a higher voltage than the clock impulse. The clock nevertheless cannot be affected because it is polarized and set to receive the opposite polarity; but, by a difference in voltage as described, either relay O or relay P in receiver E3 is actuated. These relays and relay V are neutral relays.

Instead of clock wiring, signal lines actuated by a master clock can also be used for transmission of the call impulses. Normally, a signal circuit as in Fig. 10 consists of a relay S*ig*.R1, preliminary contacts actuated by the pins screwed into the signal plate, and the signal contact S*ig*. itself. These contacts actuate the relay S*ig*.R1 if a pin is inserted in the signal plate at the desired time. Fig. 11 shows the function of the contacts of this relay S*ig*.R1 in the transmitter of the call system of Fig. 1. In the use of signal systems, the cams can rotate continuously regardless of the one-minute impulses of the clock wiring. This eliminates cams S*t*N1 and S*t*N2 as well as their control means. The mechanism of cams N1 to N4 and cam S*t*N3 remains unchanged. However, the feeler of cam S*t*N3 controls a relay S*ig*.R2 which can be actuated only if, when a signal is given, contact *sig.r*1, 1 is closed and cam S*t*N3 is at the same time passing through its initial position. Relay S*ig*.R2 holds via contact *sig.r*2, 1 until signal transmission is completed. During this time, contact *sig.r*2, 2 shuts off the relay S*t*, and the call impulses of cams N1 to N4 are inoperative. Transfer of the signal lines to the call impulse is effected, as in Fig. 12, by two additional contacts *st*2 and *st*3 of the relay S*t* shown in Fig. 1*b*.

The receiver E is similar to that of Fig. 7, and consists of two relays which control the receiving system (Fig. 9) in the same manner as for calls on clock lines. Barrier cells *z*3 in the signal circuit can keep signal transmission impulses away from the receiver for call impulses.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

I claim:

1. In a combined clock system and selective visual indicating system, the combination with a clock system comprising a master clock and including lines therefrom to a plurality of secondary clocks for operation of said secondary clocks under control of the master clock, of means for transmitting impulses of predetermined time duration, means comprising settable elements for determining which of said impulses are to be transmitted over said lines, means controlled by said master clock for initiating the operation of said impulse transmitting means, a plurality of indicating devices, control means connected to said lines and operated under control of said impulse transmitting means for controlling said indicating devices to display different indications according to the duration of the transmitted impulses, means for preventing the operation of the secondary clocks when impulses are transmitted over said lines to said control means, and further means for preventing the operation of the control means when said secondary clocks are operated under control of the master clock.

2. The combination of claim 1 wherein the means for transmitting impulses of predetermined time durations comprises a plurality of sets of contacts for controlling said impulses, a plurality of rotatable cams coacting with said sets of contacts to actuate them according to the predetermined timed relationship, and a releasable drive for said cams including a constantly rotating synchronous motor, a slip clutch and a magnetically actuated pawl for releasing said drive for rotation of said cams.

3. The combination of claim 2 wherein the means controlled by said master clock for initiating the operation of said impulse transmitting means comprises contacts periodically closed by the master clock, and a magnet energized through said contacts to actuate said pawl and release said drive for the rotation of said cams.

4. The combination of claim 1 wherein the control means for controlling said indicating devices to display different indications according to the durations of the transmitted impulses comprises a distributor including a rotary contact member and a plurality of fixed contacts having a predetermined angular spacing coacting therewith, a synchronous motor operative when energized to rotate said rotary contact member into successive coaction with the fixed contact members of said distributor, a relay operated responsive to the transmission of said impulses and having normally open and normally closed pairs of contacts, said normally open pair being connected to energize said synchronous motor for the duration of a transmitted impulse, and said normally closed pair being connected to said rotary contact member to interrupt power thereto during the rotation thereof by said synchronous motor, and a plurality of indicator control relays connected respectively to each of said fixed contacts and energized therethrough upon the cessation of a transmitted impulse when said rotary contact member is in coaction with one of said fixed contact members and said normally closed points of said relay are closed.

5. The combination of claim 1 wherein the means for preventing the operation of said secondary clocks when impulses are transmitted over said lines to said control means comprise unidirectional current flow devices connected to said lines and adapted to prevent the operation of said secondary clocks by said impulses.

6. The combination of claim 1 wherein the further means for preventing the operation of the control means when said secondary clocks are operated under control of the master clock comprises a unidirectional current flow device connected to said lines and adapted to prevent the operation of said control means when said secondary clocks are operated under control of said master clock.

7. In a combined clock system and selective visual indicating system, the combination with a clock system comprising a master clock and including lines therefrom to a plurality of secondary clocks for operation of said secondary clocks under control of the master clock, of means for transmitting impulses of predetermined time durations, means comprising settable elements for determining which of said impulses are to be transmitted over said lines and including means coacting with said impulse transmitting means for determining the order of transmission of the impulses of predetermined length when a plurality of said settable elements are concurrently set in an operated position, means controlled by said master clock for initiating the operation of said impulse transmitting means, a plurality of indicating devices connectable to said lines and operated under control of said impulse transmitting means for representing different indications according to the duration of the transmitted impulses, means for preventing the operation of the secondary clocks when impulses are transmitted over said lines to said indicating devices, and further means for preventing the operation of the indicating devices when said secondary clocks are operated under control of the master clock.

8. In a combined clock system and selective visual indicating system, the combination with a clock system comprising a master clock and including lines therefrom to a plurality of secondary clocks for operation of said secondary clocks under control of the master clock, of a source of potential, means connectable with said source of potential for transmitting impulses of predetermined time durations, means comprising settable elements for connecting said impulse transmitting means with said source of potential and for determining which of said impulses are to be transmitted over said lines, means controlled by said master clock for initiating the operation of said impulse transmitting means, a plurality of indicating devices, control means connected to said lines and operated under control of said impulse transmitting means for actuating said indicating devices to represent different indications according to the duration of the transmitted impulses, means for preventing the operation of the secondary clocks when impulses are transmitted over said lines to said control means, and further means for preventing the operation of the control means when said secondary clocks are operated under control of the master clock.

9. In a combined clock system and paging system, a master clock, secondary clocks, lines leading from said master clock to said secondary clocks for the operation thereof by said master clock, a paging impulse transmitter selectively controllable to apply paging impulses of predetermined characteristics to said lines, a receiver and indicator for receiving said paging impulses and displaying an indication according to the characteristics of the transmitted paging impulses, means in said master clock for initiating the operation of said paging impulse transmitted during periods other than when the master clock is operating said secondary clocks, means in said secondary clocks for preventing the operation of said secondary clocks by said paging impulses, and means in said receiver for preventing the operation of said receiver during the operation of said secondary clocks by said master clock.

10. In a combined clock system and paging system, a master clock, secondary clocks, lines leading from said master clock to said secondary clocks for the operation thereof by said master clock, a paging impulse transmitter selectively controllable to apply paging impulses of predetermined characteristics to said lines, a receiver and indicator for receiving said paging impulses and displaying an indication according to the characteristics of the transmitted paging impulses, means in said master clock for initiating the operation of said paging impulse transmitter during periods other than when the master clock is operating said secondary clocks, means in said secondary clocks for preventing the operation of said secondary clocks by said paging impulses, and means in said receiver and indicator for continuing the display of an indication when said master clock is operating said secondary clocks.

References Cited in the file of this patent

UNITED STATES PATENTS 2,267,812 Bryce ---------------- Dec. 30, 1941